May 4, 1954     S. P. LOVELL     2,677,647
POCKET INCUBATOR
Filed Oct. 25, 1952

INVENTOR.
Stanley P. Lovell
BY
Kenway, Jenney, Witter & Hildreth
Attys.

Patented May 4, 1954

2,677,647

UNITED STATES PATENT OFFICE 2,677,647

POCKET INCUBATOR

Stanley P. Lovell, Newtonville, Mass., assignor to Lovell Chemical Company, Watertown, Mass., a corporation of Massachusetts Application October 25, 1952, Serial No. 316,929

1 Claim. (Cl. 195—139)

This invention comprises a transparent and unbreakable pocket incubator of such constructional characteristics that micro-organisms may be deposited therein, sealed hermetically against contamination, guarded against lethal ultraviolet rays, and also cultured and developed in situ to a point where they may be identified and counted.

An important field of use of the incubator of this invention is in water analysis as conducted by health officials to guard against epidemics originating from pollution of water supply or from infection by sabotage or in biological warfare. In accordance with the present practice, liter samples of the water to be treated must be obtained, sealed, refrigerated, and transported to the analyzing laboratory. The samples are there subjected to filtering and the residue eluted and cultured in suitable nutrient. The whole process usually requires three or four days and this period, of course, may be at a critical stage in the development of epidemic conditions.

The object of the present invention is to provide a pocket incubator which will permit the filtered micro-organisms to be obtained in the field so that culture may be immediately initiated and identification of the organism made within a few hours. I have discovered that these desirable results may be obtained by employing a flat covered receptacle molded of transparent polystyrene and resembling in its general shape the well-known Petri dish. Polystyrene, or its equivalent, is an essential feature of the present invention since it is tough, flexible, resilient, and practically unbreakable. It may be molded so as to provide a heremetic seal between the tray and cover portions. It has the unique property of being impervious to ultraviolet rays in the range which is lethal to micro-organisms, that is to say, from 500 to 3000 Å. It is, moreover, transparent and has a rate of heat transmission only about one-quarter that of glass so that condensation within the incubator is eliminated to all practical intent. Its contents, therefore, are not obscured by a film of moisture and can, if desired, be directly subjected to microscopic examination without any necessity for opening the incubator in the meantime. This, of course, is not only a safeguard against contamination of the micro-organisms but protects the analyst against dangerous infection in the case of virulent bacteria.

Going more into detail, the pocket incubator of my invention comprises a tray portion having an upstanding continuous wall and a cover portion having a flat top merging into a continuous wall tapered to fit telescopically with the upstanding wall of the tray and forming a hermetic seal therewith, the cover portion comprising transparent shatterproof polystyrene having a thermal conductivity of not more than approximately $1.5$–$2.7 \times 10^{-4}$ B. t. u./ft.$^2$/sec. (°F./in.).

These and other features of the invention will be best understood and appreciated from the following description of a preferred embodiment thereof selected for purposes of illustration and shown in the accompanying drawings in which.

Figure 1:
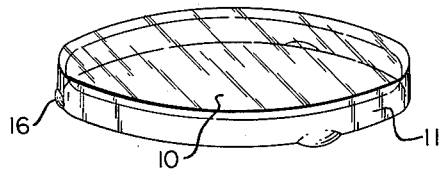
Fig. 1 is a view in perspective of the cover portion.
Figure 2:
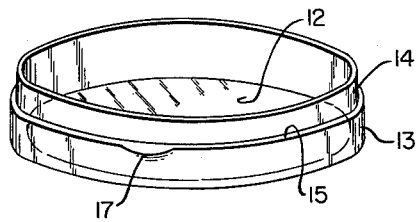
Fig. 2 is a view in perspective of the tray portion.
Figure 3:
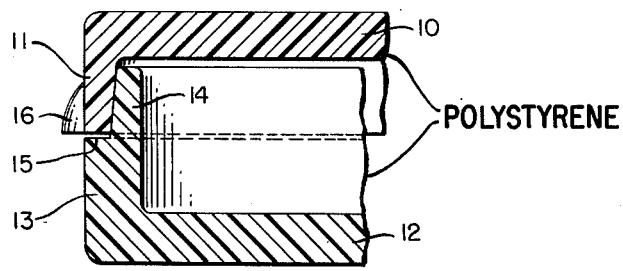
Fig. 3 is a fragmentary sectional view on an enlarged scale.

The pocket incubator herein shown comprises telescopically fitting tray and cover portions. The cover portion includes a flat circular top 10 merging into a downturned circular wall 11, preferably having a slight taper as shown in Fig. 3.

The tray portion has a flat circular bottom 12 merging into an upstanding wall which includes a relatively thick lower section 13 and a thinner upwardly tapering section 14 between which is formed an annular shoulder 15. The walls 11 and 14 are slightly flexible and fit snugly. By applying sufficient pressure the lower edge of the wall 11 may be forced into engagement with the shoulder 15 and in this way a hermetic seal is formed which persists until the cover is forcibly removed. To assist in that operation the cover is provided with radial lugs 16 adjacent to the lower edge of the wall 11. These, as herein shown, are spaced about 120° apart. The tray is provided with corresponding radial lugs 17. The lugs on the repective portions of the incubator provide flat shoulders to which pressure may be applied when it is desired to separate the cover from the tray.

The cover and tray portions of the incubator are molded of transparent polystyrene which is a resinous material having characteristics that are essential in the incubator of this invention. In the first place, polystyrene is slightly flexible, resilient, non-shatterable and so practically unbreakable as employed in the present structure. These characteristics make possible the desired telescopic hermetical seal between the cover and tray portions of the device. In the second place, polystyrene is impervious to ultraviolet rays to an extent which protects micro-organisms enclosed within the incubator from damage from a source which would otherwise be fatal. Further, as already noted, polystyrene has a low thermal conductivity and this tends to reduce internal condensation and to stabilize the internal temperature of the incubator. Finally, polystyrene is substantially unaffected by any change of temperature encountered in the normal use of the pocket incubator.

The incubator is designed to contain a circular filter sheet 18 of such material as that described in the Zsigmondy U. S. Patent No. 1,421,341 and has the property of permitting rapid passage of liquid and surface retention of micro-organisms or bacteria. The filtering step may be carried out in the field and the filter disk 18 immediately placed within the pocket incubator in contact with an underlying absorbent pad impregnated with suitable nutrient. This nutrient may be standard wet media or the pad may be impregnated with dehydrated nutrient. Activation and culturing then requires only the addition of distilled water. If the sealed incubator is now transported to the analyzing laboratory in the pocket of the analyst, his body heat will warm the incubator and its contents sufficiently to cause immediate culture of the contained bacteria and coliform organisms so that within perhaps two hours the colony will have developed sufficiently for identification.

Figure 4:
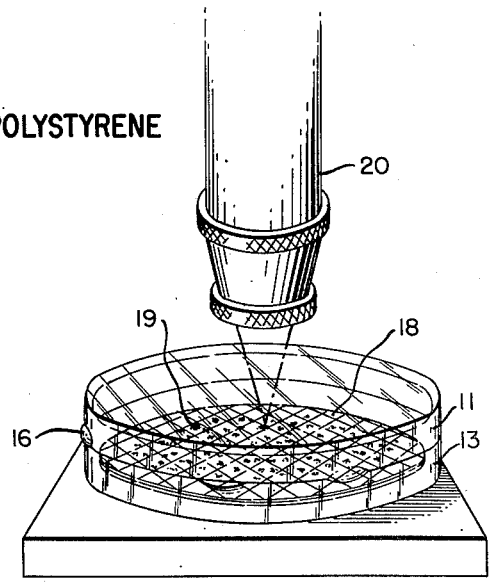
Fig. 4 is a view in perspective suggesting the microscopic inspection of bacteria contained in the incubator.

In Fig. 4 the incubator is represented as placed beneath the barrel of a microscope 20. The bacteria appears on the surface of the filter disk 18 as spots 19. These may be readily counted in the sealed incubator, the ruled area of the filter disk assisting in this respect. It will be observed that the incubator has remained hermetically sealed from start to finish, from the insertion of the filter disk, during incubation and development, and during the whole process of examination and identification, and that all of these operations have been carried out without interruption and with the highest possible expedition.

A useful variant of the above-described techniques is to sample the hydrosol at its site and underlay the filter sheet or membrane with its retained organisms with a nutrient pad wetted in Ringer's solution. Whereas, were the Pocket Incubator to be mailed to a central laboratory in cases where several days of dwell were unescapable, the retained organisms might hydrate, swell and many of them burst and be destroyed, the application of Ringer's solution I have found to act as a dormant or inhibiting agent. Upon receipt of the Pocket Incubator at its destination as at a central laboratory, the pad wetted with Ringer's solution is replaced by one wetted with a true nutrient, as, for example, the well-known Albimi M broths or Endo medium and the like, and immediately the arrested growth of coliforms, for example, is instituted.

Having thus disclosed my invention and described in detail an illustrative embodiment thereof, I claim as new and desire to secure by Letters Patent:

A pocket incubator in the form of a shallow disk comprising a circular tray portion having a flat bottom of uniform thickness merging into an upstanding circular wall having an upwardly tapered section, a cover portion having a flat top and merging into a circular wall making a telescopic hermetical seal with the tapered wall section of the tray portion, and a filter disk fitting within the circular wall of the tray portion and lying flat beneath the cover, both the tray and cover portions of the incubator being constructed of transparent polystyrene and being flexible, non-shatterable, unaffected by change of temperature, impervious to ultraviolet rays below 3000 Å and of low heat conductivity compared to glass, and thus serviceable for the incubation of microorganisms and their presentation for microscopic examination upon said filter disk while hermetically sealed.

References Cited in the file of this patent

UNITED STATES PATENTS

| Number | Name | Date |
|---|---|---|
| 119,603 | Gunning | Oct. 3, 1871 |
| 2,606,586 | Hill | Aug. 12, 1952 |